(12) United States Patent
Dill

(10) Patent No.: US 6,772,851 B1
(45) Date of Patent: Aug. 10, 2004

(54) VEHICLE WITH LOW GROUND CLEARANCE

(76) Inventor: Alvin W. Dill, 3890 Nobel Dr., #1607, San Diego, CA (US) 92122

( * ) Notice: Subject to any disclaimer, the term of this patent is extended or adjusted under 35 U.S.C. 154(b) by 35 days.

(21) Appl. No.: 10/234,950

(22) Filed: Sep. 4, 2002

(51) Int. Cl.⁷ .............................................. B62D 47/02
(52) U.S. Cl. ..................... 180/89.1; 296/178; 296/37.1; 180/297
(58) Field of Search ................. 296/178, 37.1, 296/181.1; 180/89.1, 297; B62D 47/02

(56) References Cited

U.S. PATENT DOCUMENTS

| | | | | |
|---|---|---|---|---|
| 1,452,369 A | * | 4/1923 | Fageol | 296/178 |
| 1,762,640 A | * | 6/1930 | Sanford | 296/178 |
| 1,798,011 A | * | 3/1931 | Cernuda | 296/178 |
| 2,455,429 A | * | 12/1948 | Lucien | 296/178 |
| 4,582,354 A | * | 4/1986 | Halim | 296/64 |
| D378,905 S | * | 4/1997 | Meister et al. | D12/84 |
| 5,863,070 A | * | 1/1999 | Williams et al. | 280/781 |
| 6,688,678 B2 | * | 2/2004 | Crean | 296/204 |
| 2003/0141744 A1 | * | 7/2003 | Stewart et al. | 296/185 |

* cited by examiner

*Primary Examiner*—Ruth Ilan

(57) ABSTRACT

A vehicle has a cab, a cabin, and a carrier upon a chassis. The cab has a front, sides, a roof, a windshield, an engine, a seat, and driver doors. Behind the cab, the cabin transports passengers. The cabin has walls, a roof, benches, and doors at each bench. Behind the cabin, the carrier transports luggage. The carrier has compartments, hatches, handles, and a fuel tank. The chassis has front wheels, a transaxle, and tandem rear wheels. The chassis supports the cab, the cabin and the carrier, whereby the vehicle has a low ground clearance for passenger ingress and egress.

18 Claims, 3 Drawing Sheets

VEHICLE WITH LOW GROUND CLEARANCE

BACKGROUND OF THE INVENTION

1. Field of the Invention

The present invention relates to a vehicle with low ground clearance for use in connection with transporting people and cargo. The vehicle with low ground clearance has particular utility in connection with entering and exiting a vehicle without using steps.

2. Description of the Prior Art

Vehicles with low ground clearance are desirable for less mobile passengers. Such passengers seek out vehicles that permit ready entrance and exit as well as movement within a vehicle. Present day vehicles have a passenger cabin mounted above a chassis and a powertrain. The powertrain transmits power from the engine via shafts to the drive wheels thus, moving the vehicle. Passengers access the cabin by climbing steps typically located by the vehicle driver. Once aboard, passengers walk down a central aisle to one of the upright seats, arranged side-by-side, and spaced apart longitudinally for sufficient legroom. The steps and central aisle of modern vehicles present obstacles to the less mobile passenger.

The use of passenger vehicles is known in the prior art. For example, U.S. Pat. No. 4,469,369 to Belik at al. discloses a module as a manufactured component of a vehicle. However, the Belik '369 patent does not have doors on both sides, and has further drawbacks of rear wheel drive propulsion.

U.S. Pat. No. 4,582,354 to Halim discloses a vehicle and a station that allow passengers to recline in compartments transverse to the longitudinal axis of a vehicle. However, the Halim '354 patent lacks upright seating, and additionally does not have a single deck of seating close to the ground.

Similarly, U.S. Pat. No. Des. 225,985 to Poole discloses a passenger vehicle that has a trapezoidal shape with windows and doors. However, the Poole Des. '985 patent does not store luggage separately from passengers, and cannot have benches transverse to the longitudinal axis of the vehicle.

Similarly, U.S. Pat. No. 1,917,396 to Schantz discloses a tractor vehicle body that has a rounded front to assist in pivoting. However, the Schantz '396 patent does not have separate doors for each bench, and does not have a self-propulsion system.

Similarly, U.S. Pat. No. Des. 84,576 to Fageol et al. discloses a motor vehicle that has benches with doors at each end of a bench. However, the Fageol '576 patent does not have exterior luggage storage, and cannot have all doors between the axles of the vehicle.

Lastly, U.S. Pat. No. 5,669,307 to Cichy discloses a transportation vehicle that has doorsills at two levels. However, the Cichy '307 patent does not avoid steps, and has the additional deficiencies of a central aisle and doors not at all rows of seats.

While the above-described devices fulfill their respective, particular objectives and requirements, the aforementioned patents do not describe a vehicle with low ground clearance that allows entering and exiting a vehicle without using steps. The Belik '369 patent makes no provision for doors on both sides of a vehicle. The Halim '354 patent makes no provision for upright seating on one deck. The Poole Des. '985 and the Fageol Des. '576 patents do not permit luggage storage. The Schantz '396 patent lacks separate doors for each bench. The Cichy '307 patent relies upon steps. Therefore, a need exists for a new and improved vehicle with low ground clearance that can be used for entering and exiting a vehicle without using steps. In this regard, the present invention substantially fulfills this need. In this respect, the vehicle with low ground clearance according to the present invention substantially departs from the conventional concepts and designs of the prior art, and in doing so provides an apparatus primarily developed for the purpose of entering and exiting a vehicle without using steps.

SUMMARY OF THE INVENTION

In view of the foregoing disadvantages inherent in the known types of passenger vehicles now present in the prior art, the present invention provides an improved vehicle with low ground clearance, and overcomes the above-mentioned disadvantages and drawbacks of the prior art. As such, the general purpose of the present invention, which will be described subsequently in greater detail, is to provide a new and improved vehicle with low ground clearance and method which has all the advantages of the prior art mentioned heretofore and many novel features that result in a vehicle with low ground clearance which is not anticipated, rendered obvious, suggested, or even implied by the prior art, either alone or in any combination thereof.

To attain this, the present invention essentially comprises a cab, a cabin, and a carrier upon a chassis. The cab has a front, mutually parallel sides behind the front, a roof, a windshield on the front, an engine, a driver's seat by the engine, and a pair of opposite driver doors on each side. In line with and behind the cab, the cabin transports passengers. The cabin has mutually parallel walls, two or more parallel benches across the width of the vehicle, and doors at each end of the benches. The doors have windows, while the benches divide the cabin. Behind the cabin and at the opposite end of the vehicle from the cab, the carrier transports luggage and cargo. The cabin has three compartments stacked upon each other extending across the width of the vehicle and the length of the carrier, three pairs of hatches parallel to the length of the vehicle and in the same plane as the doors, a handle for each hatch, and a fuel tank beneath the compartments. The chassis has a generally rectangular shape, a pair of front wheels connected to a transaxle powered by the engine mounted upon the chassis beneath the cab, and two pairs of rear wheels in tandem upon the chassis beneath the carrier. The front wheels and the rear wheels are parallel with the length of the vehicle. The chassis supports the cab, the cabin and the carrier, whereby the vehicle has a low ground clearance for ready passenger ingress and egress through the doors.

Further, each bench has a door at each end to permit access at both ends of a bench. Passengers pass through the doors and occupy the benches without walking upon a central aisle. There has thus been outlined, rather broadly, the more important features of the invention in order that the detailed description thereof that follows may be better understood and in order that the present contribution to the art may be better appreciated.

The invention may also include no more than an eight inch clearance above the ground, front wheel drive without a powertrain to the rear wheels, upright seating of passengers upon the benches, doors that pivot about axis closer to the cab and that have windows, doors that move as a group upon command by the driver, and a heating ventilating and air conditioning unit upon the roof of the vehicle. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and the scope of the present invention.

It is therefore an object of the present invention to provide a new and improved vehicle with low ground clearance that has all of the advantages of the prior art passenger vehicles and none of the disadvantages.

It is another object of the present invention to provide a new and improved vehicle with low ground clearance that may be easily and efficiently manufactured and marketed.

An even further object of the present invention is to provide a new and improved vehicle with low ground clearance that has a low cost of manufacture with regard to both materials and labor, and which accordingly is then susceptible of low prices of sale to the consuming public, thereby making such vehicle with low ground clearance economically available to the buying public.

Still another object of the present invention is to provide a new vehicle with low ground clearance that provides in the apparatuses and methods of the prior art some of the advantages thereof, while simultaneously overcoming some of the disadvantages normally associated therewith.

Even still another object of the present invention is to provide a vehicle with low ground clearance for entering and exiting a vehicle without using steps. This allows eight inches or less between the ground and the vehicle.

Still yet another object of the present invention is to provide a vehicle with low ground clearance for entering and exiting a vehicle without using steps. This makes it possible to enter and to exit a vehicle with a minimum of assistance from the driver.

Still yet another object of the present invention is to provide a vehicle with low ground clearance for entering and exiting a vehicle without using steps. This makes it possible to reach a seat without walking down a center aisle within a vehicle.

Lastly, it is an object of the present invention to provide a new and improved method of reducing ground clearance of a vehicle by installing an engine and transaxle upon a chassis to power the front wheels, lowering the floor between the cab and the cabin, placing benches across the width of the cabin and parallel to each other, and, pivoting doors, at the ends of each of the benches, in groups.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
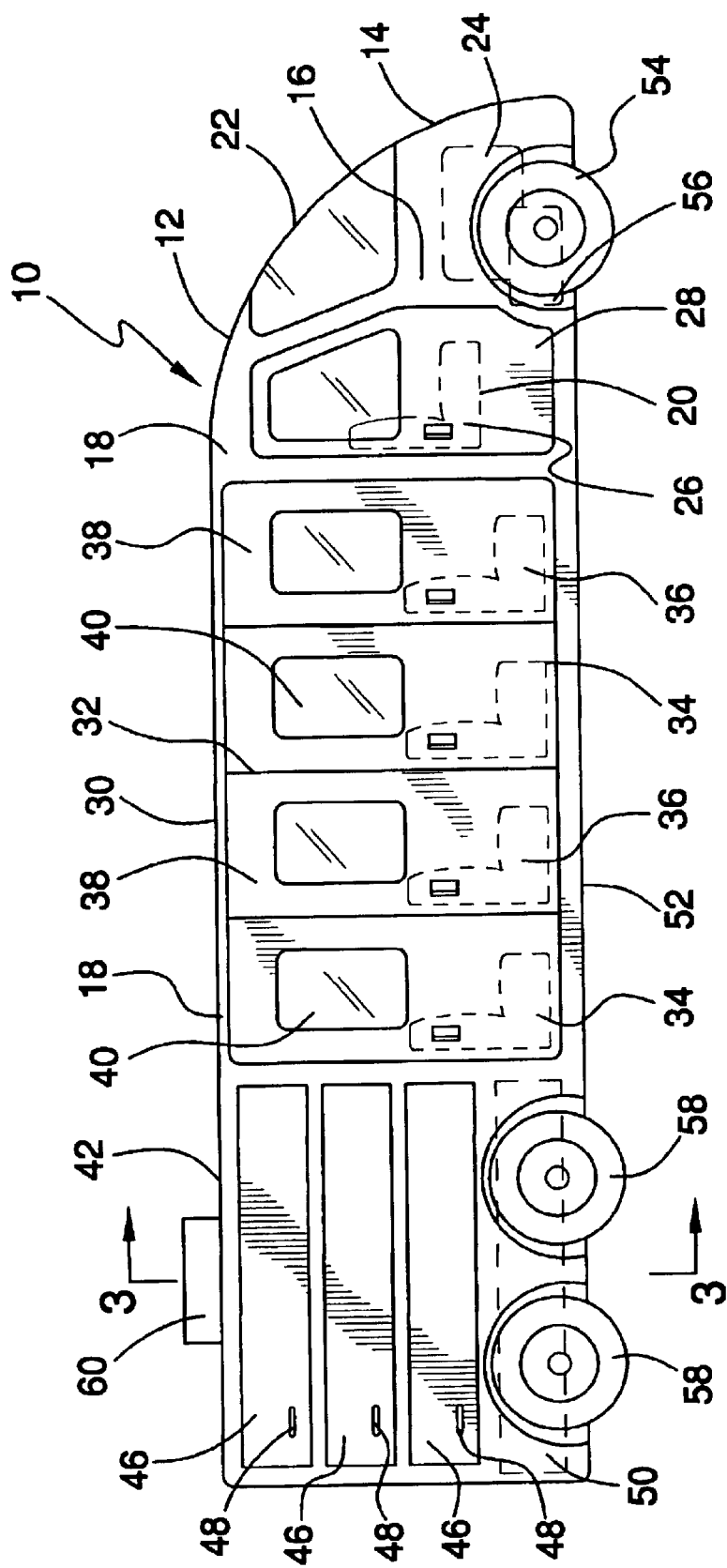
FIG. 1 is a side elevation view of the preferred embodiment of the vehicle with low ground clearance, showing benches in phantom, constructed in accordance with the principles of the present invention.
Figure 2:
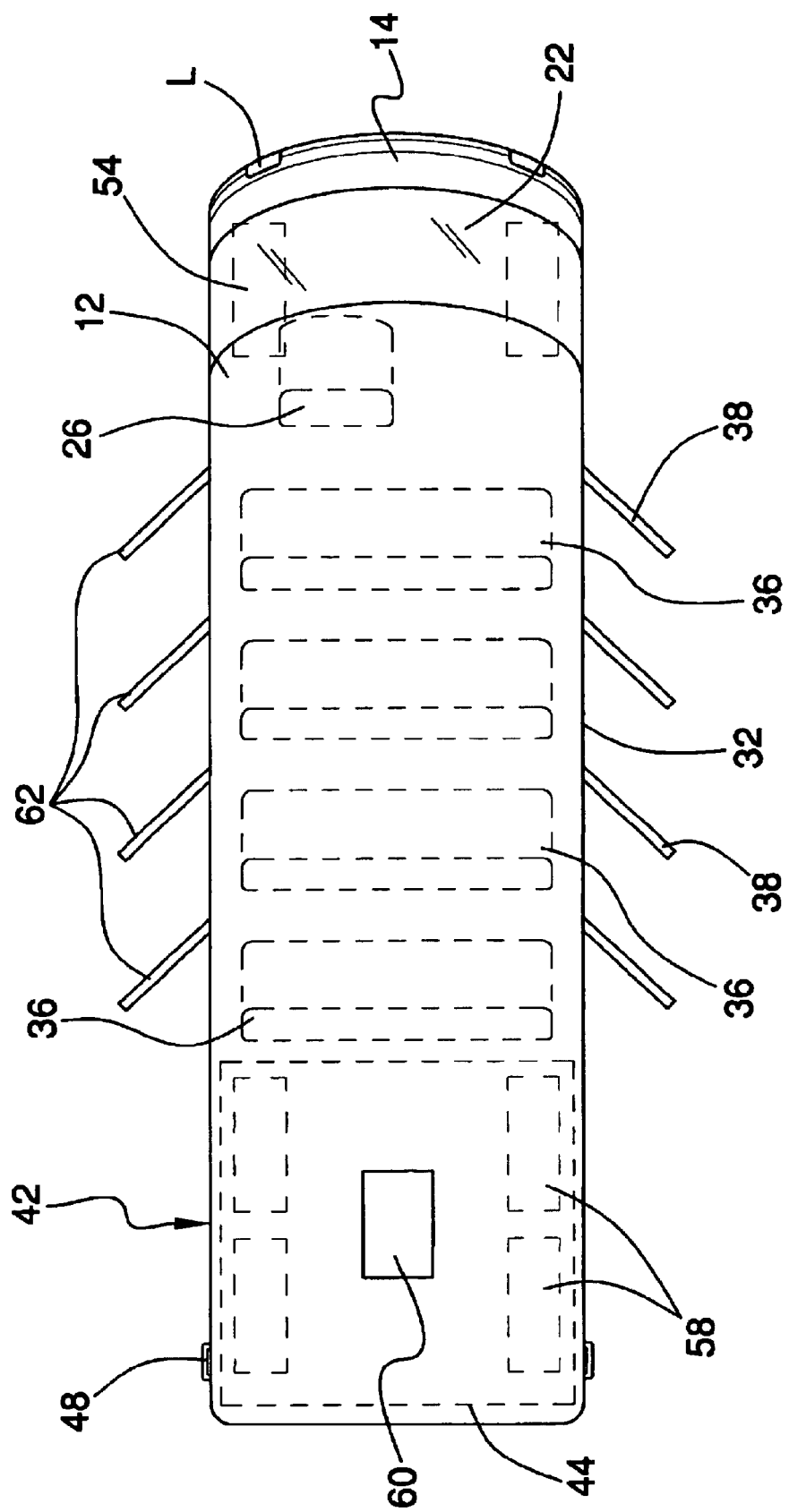
FIG. 2 is a plan view of the vehicle with low ground clearance of the present invention with doors in the open position.
Figure 3:
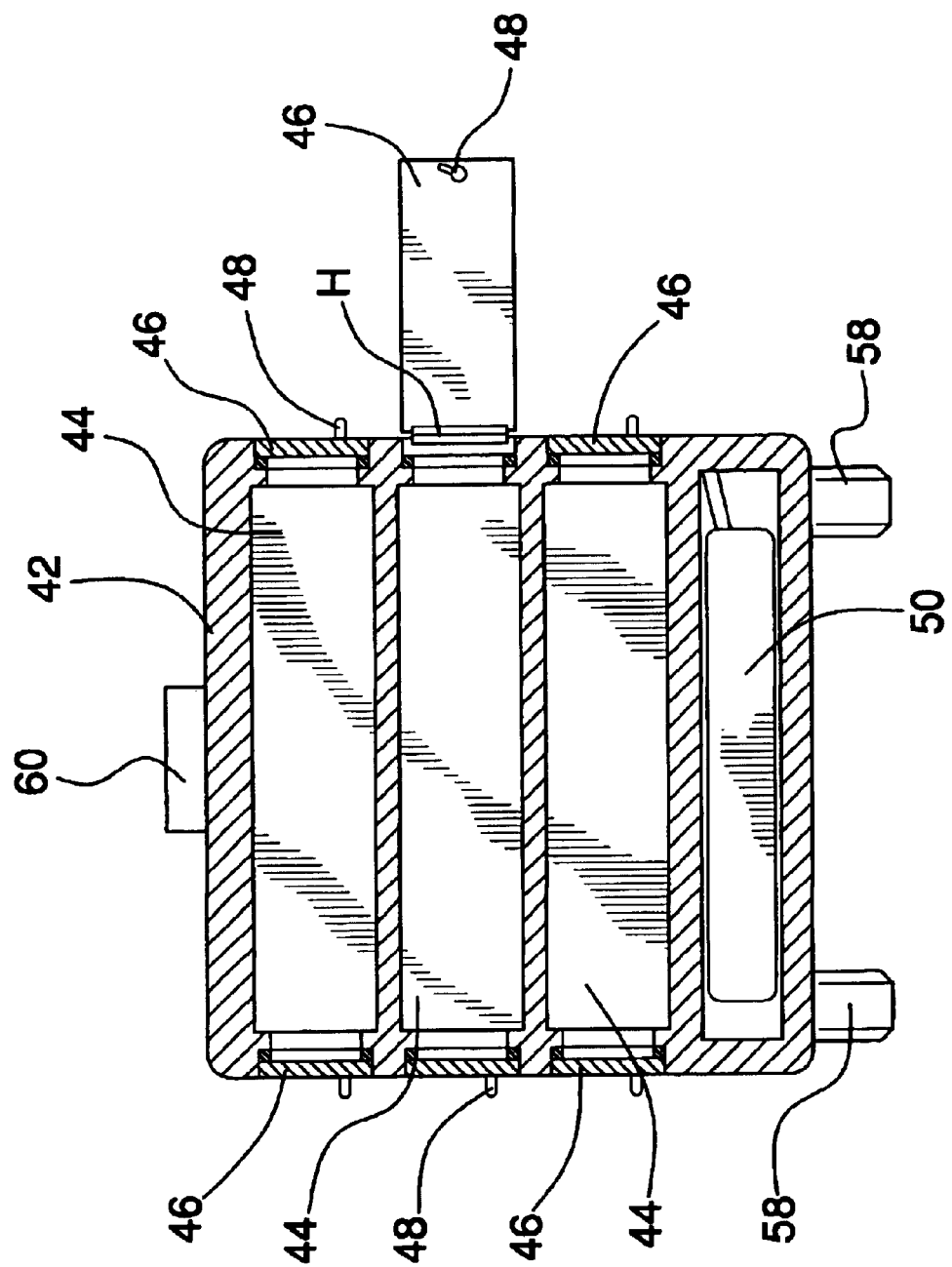
FIG. 3 is a section view of carrier of the vehicle with low ground clearance of the present invention.

Referring now to the drawings, and particularly to FIGS. 1–3, a preferred embodiment of the vehicle with low ground clearance of the present invention is shown and generally designated by the reference numeral 10.

In FIG. 1, a new and improved vehicle with low ground clearance 10 of the present invention for entering and exiting a vehicle without using steps is illustrated and will be described. More particularly, the vehicle with low ground clearance 10 has a cab 12, a cabin 30, and a carrier 42 supported upon a chassis 52. It is to be understood, that the suspension, brakes, fuel system, and other usual automotive devices, mechanisms, and accessories, though not shown, are to be included as required in the conventional state of the art in vehicle assembly. The cab 12, made of pre-formed sheet metal, has a rounded front 14, denoting the front of the vehicle 10, and a floor 20. Two sides 16 extend away from the cab 12 and perpendicular to the floor 20. A roof 18 joins the sides 16 and the front 14 to complete the cab 12. The front 14 includes a windshield 22 made of safety glass with rounded ends that extends transversely across the cab 12. A driver operates the vehicle 10 from the driver's seat 26 alongside the engine 24. In each side 16, the cab 12 has a driver door 28, with the pair of driver doors 28 opposite each other. Beneath the cab 12, the vehicle 10 has an engine 24 to power the vehicle 10.

Coaxial with and adjoining the cab 12, the vehicle 10 has a cabin 30 for transporting passengers. The cabin 30 has sheet metal construction with a floor 20, two opposing walls 32, and a roof 18 that mate with the sides 16 and the roof 18 of the cab 12. The floor 34 in the cabin 30 steps down to a lower elevation than the floor 20 in the cab 12. The cabin floor 34 serves as the measuring point for ground clearance of the vehicle 10. Ground clearance will be eight inches or less to ease ingress and egress into the cabin 30. Within the cabin 30, passengers sit upon benches 36. The benches 36 attach to the cabin floor 34 and have a transverse orientation to the longitudinal axis of the vehicle 10. In the preferred embodiment, the cabin 30 has four benches 36 arranged one behind another and parallel. Passengers sit upright upon the benches 36 and face the cab 12. In a section view parallel to the longitudinal axis of the vehicle 10, the benches 36 have an "L" shape for passenger comfort while seated. A bench 36 has two ends corresponding to the walls 32 of the cabin 30. At each end of a bench 36, the cabin 30 has a door 38 with a window 40. The doors 38 pivot on hinges H about a longitudinal axis along the edge of the door 38 closer to the cab 12. The windows 40 are centered in the doors 38 and extend upward from the bench 36. Passengers, when seated, may look out from the vehicle 10.

Adjoining the cabin 30 and away from the cab 12, the vehicle 10 has a carrier 42 for storing luggage. Constructed of pre-formed sheet metal, the carrier 42 has three compartments 44 stacked upon each other away from the floor 34. The compartments extend across the width of the vehicle 10 and the length of the carrier 42, and have a suitable height for luggage. Each compartment 44 has a pair of opposing hatches 46 coplanar with the walls 32 of the cabin 30 and parallel to the longitudinal axis of the vehicle 10. The hatches 46 pivot on hinges H about a lateral axis along the edge of the hatch closer to the cabin 30. Each hatch has a handle 48 opposite the hinges H. The handle 48 removably secures the hatch 46 to the carrier 42. Beneath the compartments 44, the carrier 42 contains the fuel tank 50 for the vehicle 10. In an alternate embodiment, a heating ventilating and air conditioning unit 60 rests upon the roof 18 of the carrier 42. The unit 60 communicates with the cabin 30 to condition the passengers' environment.

Supporting the cab 12, the cabin 30, and the carrier 42, the steel chassis 52 has a generally rectangular shape parallel to the longitudinal axis of the vehicle 10. The floor 20 of the cab 12, the floor 34 of the cabin 30, the carrier 42, and the fuel tank 50 attach to the chassis 52. Beneath the cab 12, the engine 24 and transaxle 56 attach to the chassis 52. The transaxle 56 transmits engine 24 power and steering inputs to the front wheel 54s connected to the transaxle 56. The engine 24 and transaxle 56 fit between the front wheels 54 and below the windshield 22. In the preferred embodiment, the driver's seat 26 is located behind the engine 24 towards the cabin 30 on the left side 16 of the vehicle 10. In an alternate embodiment, the driver's seat 26 is located on the right side 16 of the vehicle 10 for use in select countries. Beneath the carrier 42, two pairs of rear wheels 58 in tandem mount to the chassis 52. The front wheels 54 and the rear wheels 58 are generally coplanar with the sides 16 and the walls 32.

FIG. 2 illustrates the vehicle 10 with the doors 38 ready to accept passengers. The doors 38 have two positions: an open position with the doors 38 away from the walls 32 and a closed position with the doors 38 coplanar with the walls 32. FIG. 2 shows the open position. The doors 38 move upon command of the driver via a control mechanism. In the preferred embodiment, the control mechanism is electrically powered. In an alternate embodiment, the control mechanism is pneumatically powered. The doors 38 on each wall 32 of the cabin 30 move as a group 62. The driver moves the groups 62 of doors 38 upon each wall 32 independently. Like typical automotive design, the doors 38 pivot about a longitudinal axis on the edge of the door 38 closer to the cab 12. This pivot permits a passenger to use the door 38 as a support during ingress and egress from a bench 36. FIG. 2 describes the handles as extending perpendicular from the hatches 46 and the headlight Ls as installed in the front 14 of the cab 12.

Turning to FIG. 3, the carrier 42 stores and transports luggage and other cargo. Three compartments stacked one above another accept luggage. The compartments span nearly the width of the vehicle 10 and the length of the carrier 42. Each compartment 44 has a hatch 46 coplanar with each wall 32 of the cabin 30. The hatch 46 pivots on one or more hinge Hs about a lateral axis closer to the cab 12. Opposite the hinges H, each hatch 46 has a handle 48. The handle 48 extends perpendicular outwardly from the hatch 46 for a driver to grasp. The handle 48 also extends inwardly to secure the hatch 46 against the carrier 42 and coplanar with a wall 32 of the cabin 30. Beneath the compartments 44, the carrier 42 has the fuel tank 50 for the vehicle 10. In an alternate embodiment, above the compartments 44 the carrier 42 has a heating ventilating and air conditioning unit 60.

In use, it can now be understood that with front wheel 54 drive, the vehicle 10 has no need for a powertrain to the rear wheels 58. A powertrain typically has a transmission, shafts, and bearings to bring power to rear wheels 58. Located beneath the cabin 30, a powertrain raises the ground clearance of a vehicle 10. In the absence of a powertrain, the chassis 52 and cabin 30 ride closer to the ground. A vehicle 10 with low ground clearance loads and unloads passengers at curb height with a minimum of climbing by the passengers. The passengers step off the curb and into the vehicle 10. Secondly, the passengers enter the vehicle 10 through doors 38 for each bench 36. The passengers seat themselves directly upon a bench 36 without walking down a central aisle as in other busses. Low ground clearance and accessible seating make the vehicle 10 suitable for transport of elderly or infirm passengers to many locations.

While a preferred embodiment of the vehicle with low ground clearance has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal, plastic, composite, or a variety of wood may be used instead of the sheet metal cab and cabin described. Also, the benches may be made of heavy-duty plastic, wood, leather, or similar material. Although entering and exiting a vehicle without using steps has been described, it should be appreciated that the vehicle with low ground clearance herein described is also suitable for transporting cargo.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle with low ground clearance, comprising:
   a cab having a front and mutually parallel sides, a roof, a floor, a windshield on said front, an engine towards said front and beneath said windshield, a seat for a driver proximate to said engine, and a pair of opposite driver doors on each side;

a cabin, located adjacent to and coaxial with said cab, having mutually parallel walls, a roof, a floor, two or more parallel benches transverse to the longitudinal axis of said vehicle, said benches divide said cabin, and pairs of opposite doors at each end of said benches, each of said doors provides a window;

a carrier, located adjacent to and coaxial with said cabin, having three compartments stacked upon each other extending across the width of said vehicle and the length of said carrier, three pairs of hatches with said hatches parallel to the longitudinal axis of said vehicle and coplanar with said doors, a handle for each of said hatches extending normal to said hatch and to the longitudinal axis of said vehicle, and a fuel tank beneath said compartments; and, a chassis having a generally rectangular shape, a pair of opposing front wheels connected to a transaxle powered by said engine mounted upon said chassis beneath said cab and steered by said driver, and two pairs of opposing rear wheels mounted in tandem upon said chassis beneath said carrier, said front wheels and said rear wheels are parallel with the longitudinal axis of said vehicle, said chassis supports said cab, said cabin and said carrier, whereby said vehicle has a low ground clearance for ready passenger ingress and egress through said doors.

2. The vehicle with low ground clearance of claim 1 wherein said vehicle has a ground clearance of eight or less inches at said doors.

3. The vehicle with low ground clearance of claim 1 wherein said engine and said transaxle fit between said front wheels and said transaxle permits steering of said front wheels thereby, omitting a powertrain to said rear wheels.

4. The vehicle with low ground clearance of claim 1 wherein said driver's seat is further above said chassis than said benches permitting the driver a clear view of the roadway.

5. The vehicle with low ground clearance of claim 1 wherein said benches attach to said chassis, and said benches permit passengers to sit upright facing the front of said vehicle.

6. The vehicle with low ground clearance of claim 1 wherein said doors have two or more hinges and pivot on an axis perpendicular to said chassis and to the longitudinal axis of said vehicle, and located toward said cab upon each of said doors.

7. The vehicle with low ground clearance of claim 1 wherein said windows are located in said doors so that a passenger may see through said windows while seated.

8. The vehicle with low ground clearance of claim 1 wherein said hatches have one or more hinges and pivot on an axis perpendicular to said chassis and to the longitudinal axis of said vehicle, and located toward said cab upon each of said hatches.

9. The vehicle with low ground clearance of claim 1 further comprising, a heating ventilating and air conditioning unit installed atop said carrier and communicating with said cabin.

10. A vehicle with low ground clearance, comprising a cab having a front, mutually parallel sides, a roof, a windshield on said front, an engine towards said front and beneath said windshield, a seat for a driver proximate to said engine, and a pair of opposite driver doors on each side;

a cabin, located adjacent to and coaxial with said cab, having mutually parallel walls, a roof, two or more parallel benches transverse to the longitudinal axis of said vehicle, and pairs of opposite doors at each end of said benches, each of said doors includes a window;

a carrier, located adjacent to and coaxial with said cabin, having three compartments stacked upon each other extending across the width of said vehicle and the length of said carrier, three pairs of hatches with said hatches parallel to the longitudinal axis of said vehicle and coplanar with said doors, a handle for each of said hatches extending normal to said hatch and to the longitudinal axis of said vehicle, and a fuel tank beneath said compartments; and, a chassis having a generally rectangular shape, a pair of opposing front wheels connected to a transaxle and powered by said engine mounted upon said chassis beneath said cab, and two pairs of opposing rear wheels mounted singly and inline upon said chassis beneath said carrier, said front wheels and said rear wheels are parallel with the longitudinal axis of said vehicle, said chassis supports said cab, said cabin and said carrier, whereby said vehicle has a low ground clearance to improve ingress and egress through said doors.

11. The vehicle with low ground clearance of claim 10 wherein said benches rest upon said chassis and extend across the width of said vehicle, and said benches permit passengers to sit upright within said cabin facing said cab.

12. The vehicle with low ground clearance of claim 10 wherein said benches have an L shaped section.

13. The vehicle with low ground clearance of claim 10 wherein said doors have two or more hinges and pivot on an axis perpendicular to said chassis and to the longitudinal axis of said vehicle and located toward the front of each of said doors.

14. The vehicle with low ground clearance of claim 13 wherein said doors operate as independent groups on each side of said cabin, controlled by said driver whereby, said doors upon said wall of said cabin move simultaneously.

15. The vehicle with low ground clearance of claim 10 wherein door control means links doors to driver.

16. The vehicle with low ground clearance of claim 10 wherein said door control operates via electricity.

17. The vehicle with low ground clearance of claim 10 wherein said door control operates via compressed air.

18. The vehicle with low ground clearance of claim 10 further comprising, a heating ventilating and air conditioning unit installed atop said carrier and communicating with said cabin.

* * * * *